United States Patent Office 2,981,757
Patented Apr. 25, 1961

2,981,757
PRODUCTION OF CONDENSATION PRODUCTS

Fritz Christmann and Wilhelm Gieg, Ludwigshafen (Rhine), Germany, assignors to Badische Anilin- & Soda-Fabrik Aktiengesellschaft, Ludwigshafen (Rhine), Germany No Drawing. Filed June 24, 1958, Ser. No. 744,076
Claims priority, application Germany June 26, 1957
6 Claims. (Cl. 260—650)

It has heretofore already been known to condense organic long-chained unsaturated and/or halogen-containing compounds with cyclic compounds in the presence of condensing agents. The reaction mixture obtained is worked up by destroying the condensing agent or agents used, for example, the aluminum compounds, by heating, then separating the solid constituents and finally distilling the reaction material.

We have now found that the production of condensation products from organic long-chained unsaturated and/or halogen-containing compounds with aromatic compounds in the presence of condensing agents, preferably in dilution with a liquid hydrocarbon, preferably a halogenated hydrocarbon, can be carried out in a specially advantageous manner by adding to the reaction mixture obtained by the condensation and which still contains the condensing agent, only a small amount of water or a low molecular alcohol and then freeing the reaction material in known manner from solid constituents and subjecting it to distillation. By working in this way, the yield of valuable condensation products is considerably increased, the viscosity of the products obtained is improved and the products are more efficient.

The destruction of the condensing agent is effected according to this invention with 0.1 to 10% by weight of water, especially with 0.3 to 5% by weight, advantageously 0.5 to 3% by weight of water with reference to the organic long-chained unsaturated and/or halogen-containing compound. Instead of water low-boiling alcohols with from 1 to 4 carbon atoms can also be used.

As the first component in the condensation there may be used for example compounds with more than 6, especially more than 8, advantageously from 8 to 25 carbon atoms in the molecule. Mixtures of these compounds are especially suitable, as for example paraffinic oils, paraffin waxes, waxes, alcohols, esters, high molecular weight acids and similar high molecular carbon compounds containing oxygen, nitrogen or sulfur. If unsaturated compounds are used, these should have one or more double linkages, which may also be of diolefinic nature. When using halogen-containing compounds, e.g. chlorinated paraffin wax, one halogen atom and possibly more than one halogen atom should be present in the molecule. Preferably chlorinated paraffin wax containing from 10 to 18, advantageously from 12 to 16% by weight of chlorine may be used.

As the second component in the condensation there may be used aromatic mononuclear and/or polynuclear hydrocarbons, such as benzene, naphthalene, anthracene, phenanthrene, fluorene or phenol, cresol, xylene, naphthol and ethers thereof, as for example phenolalkyl ethers.

In general the amount of aliphatic compounds in the condensation is chosen larger than that of the aromatic compounds. Thus for example at least 1.5, advantageously 2 to 5 mols of the unsaturated compound or halogen compound are used for each mol of aromatic compound.

As the condensing agents there are suitable the Friedel-Crafts catalysts, e.g. the metal halides, as for example the chlorides of aluminum, zinc, iron, titanium or mixtures thereof or aluminum alkylchlorides or boron fluoride, or also activated metals, as for example aluminum activated with hydrochloric acid, if desired with an addition of halogen, hydrogen halide or readily fissile halogen compounds.

The temperature in the condensation may amount to about 20° to 100° C. The reaction is preferably carried out in the presence of low-boiling halogenated hydrocarbons, such as for example ethylene chloride, methylene chloride, ethylidene chloride, carbon tetrachloride and chlorobenzenes, or saturated hydrocarbons, such as, for example heavy gasoline, kerosine and reduction products of carbon monoxide.

The reaction mixture obtained by the condensation has the above-stated small amount of water or low molecular alcohol added to it. It is of advantage to add the water or alcohol gradually and to stir the reaction mixture during the addition.

Furthermore it has proved to be beneficial to refine the condensation product further after the addition of a small amount of water or alcohol by stirring it with an adsorption agent, such as bleaching earth, for example bleaching earth containing crystal water, bentonite or synthetic silicates, if desired with the addition of a neutralizing agent, such as lime or zinc oxide, and heating to temperatures of 200° to 300° C.

For the separation of the solid constituents, the condensation product is preferably centrifuged or filtered in the presence of a diluent, as for example kerosine or heavy gasoline.

By subsequent distillation, advantageously in vacuo, the condensation product is separated into a light lubricating oil and a highly viscous fraction of 100° to 200° Engler at 100° C. The said fraction is a highly efficient agent for depressing the pour point of Diesel oils, lubricating oils and heating oils. It can also be used as a filter aid in the dewaxing of high-boiling oils, such as lubricating oils.

The following examples will further illustrate this invention but the invention is not restricted to these examples.

*Example 1*

100 parts by weight of a hard paraffin wax chlorinated at about 85° C. (melting point 52° to 54° C.) and having a chlorine content of about 14% by weight are diluted with 100 parts by weight of dichlorethane and condensed with the addition of 15 parts by weight of naphthalene and 7 parts by weight of aluminum chloride in a stirring still, the reaction temperature slowly rising from 20° to about 35° C.

When the reaction has ended, 0.5 to 1% by weight of water (with reference to the chlorinated paraffin wax introduced) is added a little at a time, the active aluminum compounds present thereby being destroyed.

For further purification, the reaction material is then transferred to another stirring vessel and heated to a temperature of about 240° C. with the addition of 1 part by weight of lime, 3 parts by weight of bleaching earth and about 10 parts by weight of a light lubricating oil, the solvent dichlorethane thereby being recovered. After cooling to 150° C., the product is diluted with 100 parts by weight of kerosine and freed from solid constituents in a centrifuge. By continuous distillation in vacuo there are obtained as distillate, besides kerosine, 20 parts by weight of light lubricating oil containing paraffin wax and, as vacuum residue, about 90 parts by weight having a viscosity of 180° Engler at 100° C.

0.02% by weight of this residual oil depresses the pour point of a motor oil from −3° C. to −23° C.

If, on the contrary, the destruction of the active aluminum compounds is effected by heating the reaction material to 220° to 240° C., there are obtained only 70 parts by weight of a viscous residual oil with a viscosity of 50° to 100° Engler at 100° C. which has less activity as a pour point depressor.

*Example 2*

100 parts by weight of a paraffin wax with a melting point of about 53° C., which has been chlorinated at 92° C. and contains about 14% by weight of chlorine are gradually condensed in 120 parts by weight of trichlorbenzene with 7 parts by weight of aluminum chloride in a stirring flask, while adding 15 parts by weight of naphthalene. During the reaction the temperature slowly rises from 20° C. to 35° C.

When the reaction has come to an end, 2 to 4% by weight of water or methanol are added in small portions, percentage with reference to the paraffin feed.

The reaction mixture is then passed into another stirring vessel for further refining and heated to 220° C. in the presence of 1 part by weight of activated bleaching earth. At this stage the high-boiling trichlorbenzene (B.P. 212° C. to 230° C.) is not yet distilled off. The product is then cooled down to 150° C. and stripped of solid constituents in a centrifuge. When then subjected to a continuous distillation in vacuo, the product yields about 10 parts by weight of a light paraffin containing lubricating oil and some trichlorbenzene as a distillate and about 98 parts by weight of a residue with a viscosity of about 100° Engler at 100° C.

Added in an amount of 0.08% by weight the said residue makes a Diesel fuel or a light heating oil as filterable at a temperature of −24° C. as it formerly was at −16° C. when no such addition had been made.

We claim:

1. In a process for the production of a condensation product by condensation of an aliphatic hydrocarbon having from 8 to 25 carbon atoms selected from the group consisting of unsaturated and halogenated aliphatic hydrocarbons together with an aromatic hydrocarbon in the presence of a Friedel-Crafts catalyst, the improvement which comprises adding to the reaction mixture after condensation from 0.1 to 10% by weight, with reference to said aliphatic hydrocarbon, of a liquid selected from the group consisting of water and lower alkanols, heating the reaction mixture containing said liquid to about 200° C. to 300° C. in the presence of an adsorption agent, separating the solid constituents from the reaction mixture and distilling to separate a condensation product having a viscosity of about 100° to 200° Engler, measured at 100° C.

2. In a process for the production of a condensation product by condensation of a chlorinated paraffin of from 8 to 25 carbon atoms containing from 10 to 18% by weight of chlorine together with naphthalene in the presence of a Friedel-Crafts catalyst, the improvement which comprises adding to the reaction mixture after condensation from 0.1 to 10% by weight, with reference to said chlorinated paraffin, of a liquid selected from the group consisting of water and lower alkanols, heating the reaction mixture containing said liquid to about 200° C. to 300° C. in the presence of an adsorption agent, separating the solid constituents from the reaction mixture and distilling to separate an alkylated naphthalene condensation product having a viscosity of about 100° to 200° Engler, measured at 100° C.

3. An improved process as claimed in claim 2 wherein the added liquid is water.

4. An improved method as claimed in claim 2 wherein the added liquid is methanol.

5. In a process for the production of a condensation products by condensation of a chlorinated paraffin of from 8 to 25 carbon atoms containing from 10 to 18% by weight of chlorine together with naphthalene in the presence of a Friedel-Crafts catalyst, the improvement which comprises adding to the reaction mixture after condensation from 0.3 to 5% by weight of water, with reference to said chlorinated paraffin, heating the reaction mixture containing said water to about 200° C. to 300° C. in the presence of an adsorption agent and a neutralizing agent, separating the solid constituents from the reaction mixture and distilling to separate an alkylated naphthalene condensation product having a viscosity of about 100° to 200° Engler, measured at 100° C.

6. In a process for the production of a condensation product by condensation of a chlorinated paraffin of from 8 to 25 carbon atoms containing from 10 to 18% by weight of chlorine together with naphthalene in the presence of a Friedel-Crafts catalyst, the improvement which comprises adding to the reaction mixture after condensation from 0.3 to 5% by weight of water with reference to said chlorinated paraffin, heating the reaction mixture containing said water to about 200° C. to 300° C. in the presence of a bleaching earth containing crystal water and lime, separating the solid constituents from the reaction mixture and distilling to separate an alkylated naphthalene condensation product having a viscosity at 100° C. of about 180° Engler.

References Cited in the file of this patent

UNITED STATES PATENTS

| | | |
|---|---|---|
| 2,211,704 | Robinson | Aug. 13, 1940 |
| 2,454,452 | Hodges | Nov. 23, 1948 |